Feb. 27, 1951     D. M. LAWRENCE     2,543,112
COWL FLAP CONTROL FOR AIRCRAFT
Filed July 5, 1946     2 Sheets-Sheet 1

INVENTOR.
DONALD M. LAWRENCE
BY
-ATTORNEY-

Patented Feb. 27, 1951

2,543,112

UNITED STATES PATENT OFFICE 2,543,112

COWL FLAP CONTROL FOR AIRCRAFT

Donald M. Lawrence, Wood-Ridge, N. J., assignor to Bendix Aviation Corporation, Teterboro, N. J., a corporation of Delaware Application July 5, 1946, Serial No. 681,621

2 Claims. (Cl. 123—41.06)

My invention relates to control systems and devices and more particularly to an improved means for automatically operating fluid flow control flaps which form part of the cowling of an aircraft engine, or for a ventilating duct or the like.

An object of my invention is to provide means responsive to the temperature of the engine and the cooling fluid medium for differentially actuating the fluid flow flaps in accordance therewith.

Another object of my invention is to provide means responsive to variation in temperature of the cooling medium for automatically opening the flow flaps upon an increase in temperature and closing the flow flaps upon a decrease in the temperature of the cooling medium.

Another object of my invention is to provide means responsive to the temperature of the aircraft engine and the temperature of a fluid cooling medium for varying the adjustment of a control means for said cooling medium.

Another object of my invention is to provide a novel floating lever arrangement having a control means operably connected thereto and a first temperature responsive means and a second temperature responsive means connected to said lever in such a manner that the control means may be differentially operated thereby.

Another object of my invention is to provide a novel system for controlling the cooling of an aircraft engine, including a first control means responsive to the temperature of the engine and a second control means responsive to the temperature of a cooling medium, and both of said control means simultaneously controlling the flow of the cooling medium.

Another object of my invention is to provide in combination a first means reacting relatively slowly to temperature change within the engine and a second means reacting relatively rapidly to temperature change within the engine cowling, both of said means arranged for jointly effecting the adjustment of the flow of a cooling medium within said cowling.

Another object of my invention is to provide novel means for effecting a relatively stable automatic cowl flap control for an aircraft, wherein the hunting periods of the control will be relatively infinitesimal.

Another object of my invention is to provide a novel cowl flap control combining a first means responsive directly to the engine cylinder temperature, and a second means responsive to the temperature of the cooling medium for the engine so as to provide in effect means for anticipating change in engine temperature due to change in the temperature of the cooling medium.

Other objects and advantages of this invention are set forth in the following description taken with the accompanying drawing; and the novel features thereof are pointed out in the appended claims. The disclosure, however, is illustrative only and changes may be made in detail, especially in matters of shape, size, and arrangement of parts within the principle of the invention to the full extent indicated by the broad and general meanings of the terms in which the appended claims are expressed.

Figure 1:
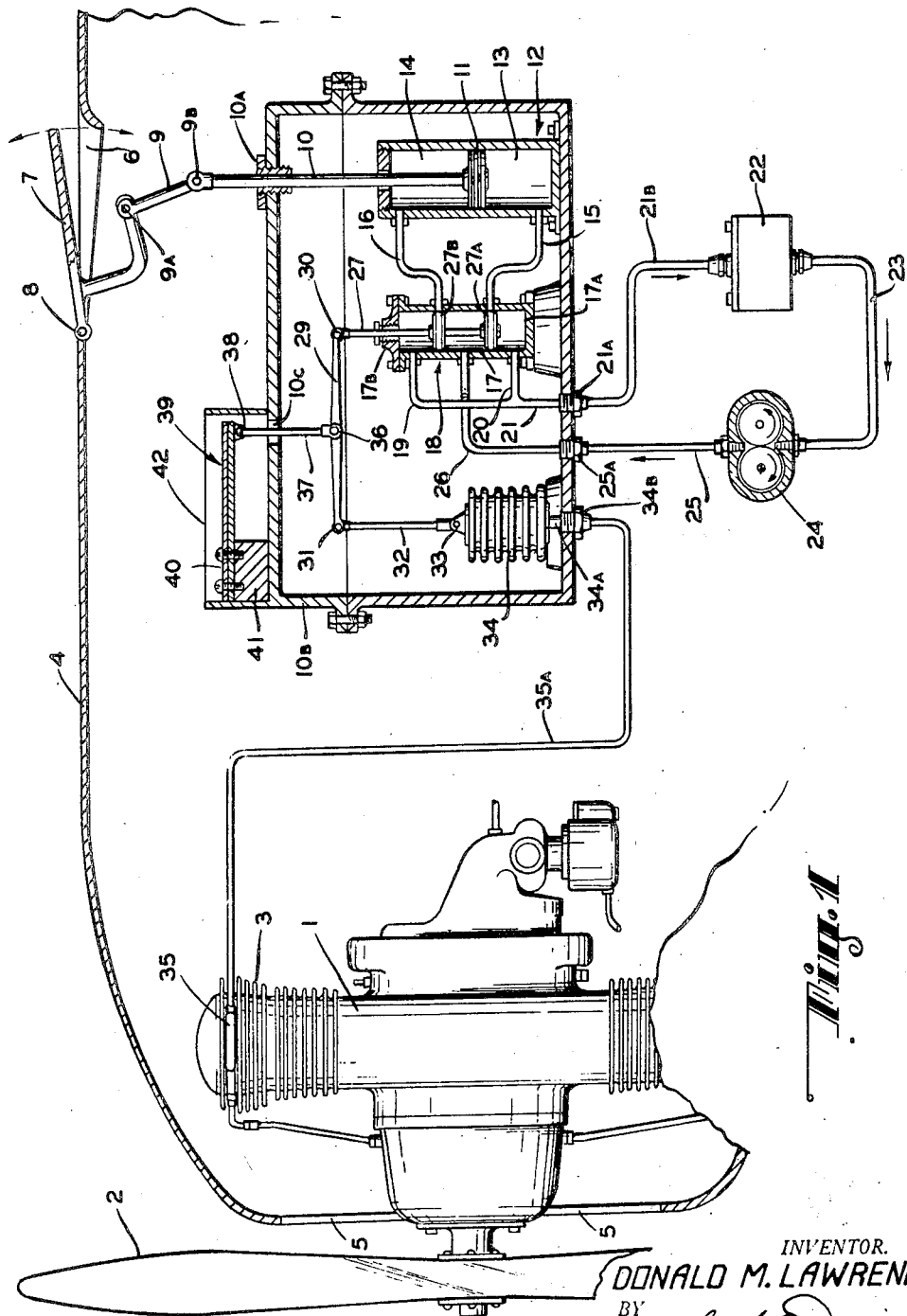
Figure 1 is a diagrammatic sectional view of one form of the invention.

Referring to the drawing of Figure 1, there is shown an aircraft engine whose temperature it is desired to control indicated at 1. The engine 1 is shown as an internal combustion engine of the radial cylinder air cooled type having the usual propeller 2 and engine cylinders 3. The engine cylinders 3 are mounted in the conventional manner within the nacelle skin. The engine proper is surrounded by an annular cowling 4 having an air inlet 5 at the forward or leading edge thereof. The cowling 4 is provided with a series of air outlet openings one of which is shown at 6, extending longitudinally of the cowling 4. Each opening 6 is provided with a shutter 7 pivotally connected at 8 to the cowling 4. The shutter 7 may completely close its respective opening 6 as well as uncover the said opening 6 in different degrees.

The shutter 7 is shown diagrammatically as pivotally connected at 9A to one end of an actuating link 9 which has the opposite end thereof pivotally connected at 9B to a piston rod 10, which projects through an opening 10A formed in a casing 10B. The piston rod 10 is controlled by a piston 11 longitudinally movable within a cylinder 12 mounted within the casing 10B. The piston 11 divides the cylinder 12 into chambers 13 and 14.

The chambers 13 and 14 are connected respectively by pipes 15 and 16 to a valve chamber 17 formed in a control valve 18. The valve chamber 17 is closed at opposite ends by the sealing members 17A and 17B.

Pipes 19 and 20 lead from opposite ends of the valve chamber 17 and are connected by a pipe 21 to a pipe connector 21A of a suitable type, which projects through the casing 10B. The connector 21A is connected by a pipe 21B to a supply or storage tank 22 for a suitable fluid medium such as oil, whereby fluid medium may be returned under pressure from said valve chamber 17 to the storage tank 22.

A pipe 23 leads from the storage tank 22 to a gear pump 24 driven by a suitable power means so as to draw said fluid medium from the tank 22 through the pipe 23 into the gear pump 24. An outlet pipe 25 leads from the gear pump 24 and conducts the fluid medium under pressure of the gear pump 24 to a pipe connector 25A which also projects through the casing 10B. The pipe connector 25A is in turn connected within the casing 10B to the valve chamber 17 of the control valve 18 at a point intermediate the openings to the pipes 15 and 16. A valve stem 27 is longitudinally adjustable in the valve chamber 17 and has provided the valve members 27A and 27B fixedly mounted on the valve stem 27 for controlling the openings to the pipes 15 and 16, respectively.

In Figure 1, the valve stem 27 is shown as adjusted so that the valve members 27A and 27B close the openings to the pipes 15 and 16, respectively. However, upon the longitudinal adjustment of the valve stem 27 from the position shown, toward the end member 17A, it will be readily seen that the pipes 15 and 16 will be opened by the valve members 27A and 27B, respectively, and fluid medium under the force of the gear pump 24 will be drawn from the supply tank 22, through pipe 23 to gear pump 24 and forced under pressure from the gear pump 24 through pipe 25, connector 25A, pipe 26, valve chamber 17, pipe 15 to chamber 13, biasing the piston 11 so as to adjust the shutter 7 in a counterclockwise direction for opening the outlet 6. Such adjustment of the piston 11 further causes fluid medium within chamber 14 to pass through pipe 16 into valve chamber 17 and return to the supply tank 22 through pipe 19, pipe 21, connector 21A and pipe 21B.

Moreover, upon longitudinal adjustment of the valve stem 26 from the position shown, toward the end member 17B, it will be readily seen that fluid medium under pressure of the gear pump 24 will enter the chamber 14 biasing the piston 11 in a direction for causing the closing of the air outlet 6.

In order to automatically control the operation of the valve 18, I have provided a floating lever 29 pivotally connected at one end 30 to the valve stem 27. The opposite end of the floating lever 29 is pivotally connected at 31 to an actuating rod 32. The actuating rod 32 is pivotally connected at 33 to an expansible bellows 34 mounted within the casing 10B. The interior of the bellows 34 is connected by a pipe 34A to a pipe connector 34B which projects through the casing wall 10B. The connector 34B is connected by a pipe 35A to a bulb 35 which is mounted within and adjacent the cylinder 3. The bulb 35, pipe 35A, connector 34B, pipe 34A and interior of bellows 34 contains a suitable fluid medium of a type well known in the art and expansible upon a rise in temperature at the cylinder block so as to expand the bellows 34, and cause the contraction of the bellows 34 upon a decrease in the temperature of the cylinder block 3. Thus a rise in the engine cylinder temperature will cause the lever 29 to move in a clockwise direction about a point 36 positioned intermediate the opposite ends of the lever 29 while a decrease in the temperature of the engine cylinder 3, will cause the floating lever 31 to move in a counterclockwise direction about the point 36.

Pivotally connected at the point 36 is an actuating rod 37. The actuating rod 37 projects through an opening 10C formed in the casing 10B and is pivotally connected at 38 to a bimetallic strip 39 which in turn is fixedly mounted at an end 40 to a block 41 affixed at the outer side of the casing 10B. The bimetallic strip 39 is spaced apart from the outer surface of the casing 10B so as to readily respond to change in temperature of the airstream flowing in to the cowling 4 from the inlet 5 and out at the outlet 6, as distinguished from the engine cylinder 3. The bimetallic strip 39 is so arranged as to flex in a clockwise direction about the fixed end 40 upon an increase in the temperature of the airstream. Further, the strip 39 flexes in a counterclockwise direction about the fixed point 40 upon a decrease in the temperature of the airstream.

The said airstream is arranged to enter the cowling 4 through the forward air inlet 5 so as to flow across the engine cylinder 3, and then across the bimetallic strip 39 spaced apart from the engine cylinder as shown, whereby the bimetallic element 39 may indicate change in the temperature of the cooling medium as distinguished from the engine temperature. Change in the temperature of the engine is indicated by the temperature responsive bulb 35. As shown, the airstream passes from the bimetallic element 39 out the engine cowl through the outlet 6. The supply of such fluid air medium may of course be controlled by varying the size of the opening 6 by the adjustment of the shutter 7. The casing 10B may be conveniently mounted within the cowling 4 by brackets or other suitable supporting means and a guard 42 may surround the bimetallic element 39 so as to protect the same from the force of the fluid medium.

In the operation of the foregoing control system, it will be seen that movement of the flap 7 will immediately effect the volume or mass of air flowing through the cowling 4. Moreover, for any short period of time, conditions being equal, the heat dissipated from the cylinder 3 will be constant. However, a change in the mass flow of air through the cowling 4 and across the engine 1 will cause an immediate reaction in the air stream temperature. The bimetallic strip 39 will react rapidly to change in temperature of the air stream due to the low inertia of the air and rapidity with which change in air temperature may be effected. However, change at the engine cylinder due to change in the mass flow of air will be relatively slow, due to the inertia and greater mass at the engine cylinder, so that the temperature responsive bulb 35 will be relatively slow to respond to change in the temperature of the cooling mass or airstream.

It will be readily seen that if the flaps 7 were controlled merely from the temperature of the engine relatively long periods of hunting would result due to the extremes at which the flaps would be adjusted so as, for example, to effect, first a rise in temperature, and then a decrease in temperature, so that the engine might approach the desired optimum temperature. While, if the flaps were adjusted merely in response to the temperature of the cooling medium by the bimetallic member 39, for example, there would be no true indication as to the temperature of the engine, since the temperature of the cooling medium or air flow might well vary due to natural causes not reflecting the temperature of the engine.

By combining the two temperature responsive means 35 and 39 in the manner indicated, however, the bimetallic member 39 tends to react to change in temperature of the cooling medium more rapidly than the bulb 35 and thus tends to reset or move the flap towards the position of stability, so as to prevent the extreme adjustments of the flap 7 which would otherwise result, if the same were solely under the control of the bulb 35.

Figure 2:
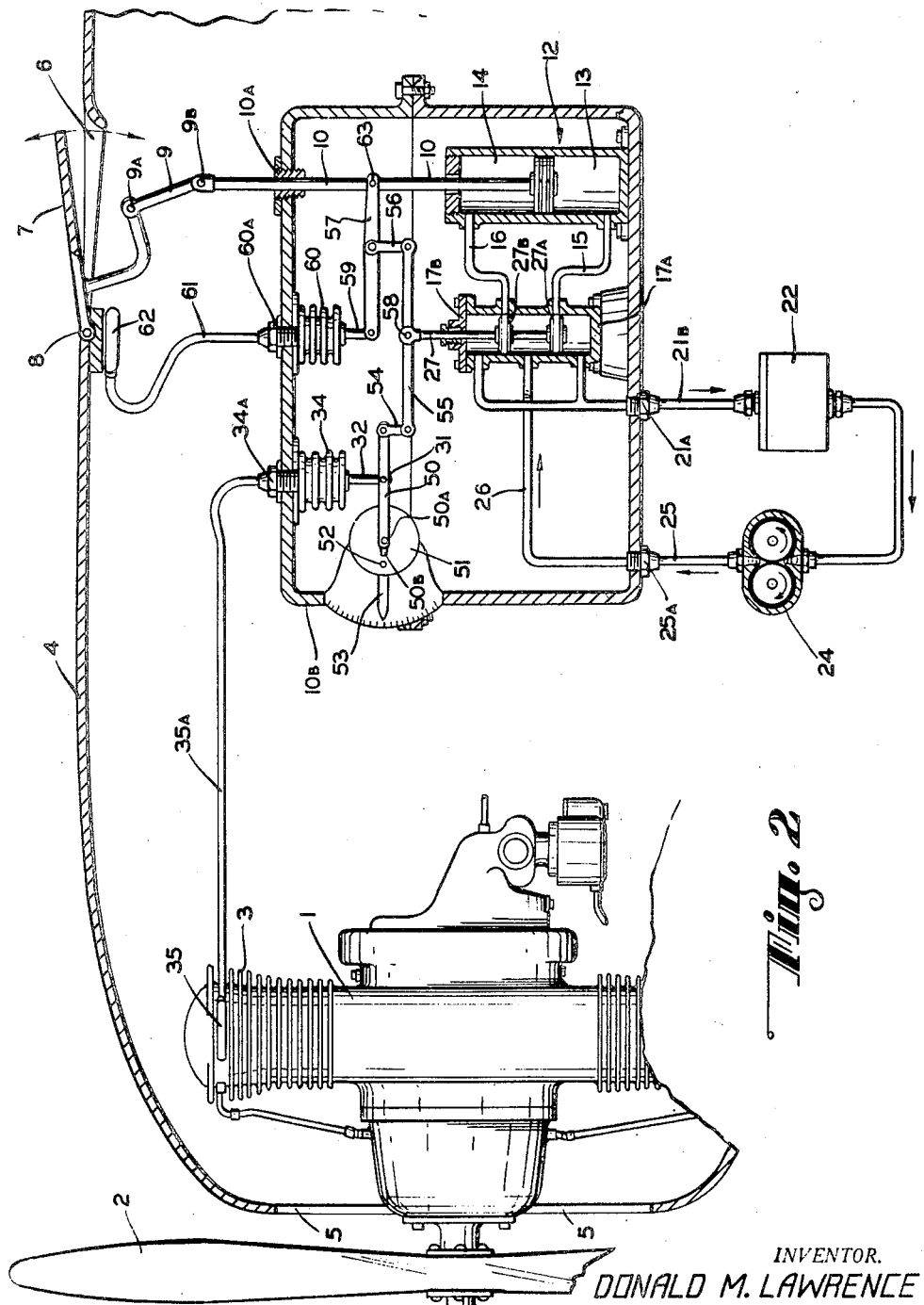
Figure 2 is a diagrammatic sectional view of a second form of the invention.

A second form of the invention is shown in Figure 2 in which like numerals indicate corresponding parts to those shown in Figure 1. In the arrangement of Figure 2, the bellows 34 is connected by rod 32 at 31 to an adjustable arm 50. The arm 50 is pivotally connected at 50A to an adjustment member 51. The pivot 50A is slidably mounted in a suitable slot 50B formed in the adjustment member 51.

The member 51 is pivotally mounted at 52 and has a pointer 53 through which the same may be manually adjusted so as to vary the temperature setting of the regulator by varying the position of the pivot 50A.

The opposite end of the arm 50 is pivotally connected at 54 through a suitable linkage to one end of a floating lever 55. The opposite end of the floating lever 55 is pivotally connected by a suitable linkage 56 to a point intermediate the opposite ends of a floating lever 57. The floating lever 55 is connected at a point 58 intermediate its opposite ends to the control valve 27.

One end of the floating lever 57 is connected by a rod 59 to an expansible bellows 60 mounted within the casing 10B. The interior of the bellows 60 is connected by a pipe connector 60A which projects through the casing wall 10B to a pipe 61. The pipe 61 leads to a temperature responsive bulb 62 which is mounted within the cowling 4 and adjacent the opening 6 in spaced relation to the engine cylinder 3 so as to respond to the temperature of the airstream flowing in the cowling 5 from the inlet 5 and out at the outlet 6, as distinguished from the engine cylinder 3.

The bulb 62, pipe 61 and interior of the bellows 60 contains a suitable fluid medium of a type well known in the art and expansible upon a rise in the temperature of the airstream so as to expand bellows 60, while the bellows 60 contracts upon a decrease in the temperature of the airstream so as to effect a corresponding adjustment of the control valve 27.

The opposite end of the lever 57 is pivotally connected at 63 to the piston rod 10 so that upon adjustment of the control valve 27 in response to change in temperature of the airstream the resulting adjustment of the piston 11 effects through the lever 57, link 56 and lever 55 a follow up or resetting adjustment of the control valve 27 to the neutral position.

The operation of the form of the invention shown in Figure 2 will be readily apparent from the previous description of Figure 1. It will be readily seen, however, from the foregoing that in the form of the control shown in Figure 2, there is provided novel means for controlling the temperature of the engine 1 including means for adjusting the temperature setting, the member 53, and means for resetting the control in response to movement of the flap 7 that is the linkage arrangement 57.

Although only two embodiments of the invention have been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. A cooling system for an aircraft engine of the type including a cowling surrounding said engine, said cowling having provided an air inlet and an air outlet whereby a stream of air may flow through said cowling for cooling said engine, a shutter located at the air outlet for controlling the rate of flow of said airstream, and first means responsive to the temperature of said engine for adjusting said shutter so as to vary the rate of flow of said airstream so as to maintain a predetermined engine temperature; the improvement comprising second means positioned in said airstream at a point adjacent said shutter and responsive only to change in the temperature of the airstream so as to anticipate change in engine temperature due to change in the airstream temperature, third means operated by said first and second means whereby said shutter may be simultaneously adjusted thereby for controlling the rate of flow of said airstream, and fourth manually adjustable means to vary the response of said first and second means to the temperature of the engine and airstream, respectively.

2. For use in an aircraft having a combustion engine, a cowling surrounding said engine having an air inlet and an air outlet whereby a stream of air may flow through said cowling for cooling said engine, and a shutter at said air outlet for controlling the rate of flow of said airstream, whereby said engine temperature may be maintained at a predetermined temperature, a regulator for the adjustment of said shutter comprising a first temperature responsive means having a sensing element mounted adjacent said engine and responsive to changes in engine temperature, said first temperature responsive means being operated by said sensing element in response to changes in engine temperature, a second temperature responsive means having a sensing element positioned within said airstream, said sensing element being responsive to changes in the airstream temperature, said second temperature responsive means being operated by its sensing element in response to changes in the airstream temperature, a fluid pressure motor for adjusting said shutter, a valve for controlling the operation of said motor, a floating lever pivotally connected to said valve, pivotal connections between said first and second temperature responsive means and said floating lever whereby said valve is actuated by the operation of the first and second temperature responsive means in response to their respective sensing elements to thereby operate said fluid motor to adjust said shutter, a pivotal connection between said fluid motor and floating lever for imparting a follow-up action to said valve upon movement of said motor, and manually adjustable lever means pivotally connected to said floating lever to vary the response of said first and second temperature responsive means to the temperature of the engine and airstream, respectively.

DONALD M. LAWRENCE.

REFERENCES CITED

The following references are of record in the file of this patent:

UNITED STATES PATENTS

| Number | Name | Date |
| --- | --- | --- |
| 1,376,462 | Robertshaw | May 3, 1921 |
| 2,081,762 | Nissen | May 25, 1937 |
| 2,101,369 | Jorgensen | Dec. 7, 1937 |
| 2,168,599 | Beisel | Aug. 8, 1939 |
| 2,255,639 | Annin | Sept. 9, 1941 |
| 2,268,083 | Rapuano | Dec. 30, 1941 |
| 2,341,789 | Justus | Feb. 15, 1944 |
| 2,432,186 | Whann | Dec. 9, 1947 |

FOREIGN PATENTS

| Number | Country | Date |
| --- | --- | --- |
| 343,017 | Great Britain | Jan. 28, 1931 |
| 697,925 | Germany | Oct. 26, 1940 |